June 9, 1936. W. H. HOFER Re. 20,000

APPARATUS AND PROCESS FOR UNCOILING COILED SHEET METAL

Original Filed Dec. 10, 1932 2 Sheets-Sheet 1

INVENTOR

William H. Hofer

BY

George Relm

ATTORNEY

June 9, 1936. W. H. HOFER Re. 20,000

APPARATUS AND PROCESS FOR UNCOILING COILED SHEET METAL

Original Filed Dec. 10, 1932 2 Sheets-Sheet 2

INVENTOR

William H. Hofer

BY

Geo. Ramm

ATTORNEY

Reissued June 9, 1936

Re. 20,000

UNITED STATES PATENT OFFICE 20,000

APPARATUS AND PROCESS FOR UNCOILING COILED SHEET METAL

William H. Hofer, Middletown, Ohio, assignor to The American Rolling Mill Company, Middletown, Ohio, a corporation of Ohio Original No. 2,020,889, dated November 12, 1935, Serial No. 646,660, December 10, 1932. Application for reissue March 10, 1936, Serial No. 68,139

9 Claims. (Cl. 242—78)

The general method heretofore practiced for uncoiling coils of sheet metal has comprised the placing of the coil in a cradle of idler rollers, engaging the end of the metal and pulling the metal away from the coil substantially in a tangential manner, the coil being rotated in its cradle by the pull of the metal as it is being withdrawn. Such apparatus and method has been productive of the difficulty known as coiler breaks. Coil breaks are changes in the physical characteristics of the metal produced by a sharp bend therein. While the bend itself may be removed by subsequent roller leveling, the physical condition brought about by this excessive working of the metal persists in the piece through subsequent operations, such as cold rolling and the like, and has, in the past, been a major source of rejections.

It is an object of my invention to provide a decoiling apparatus which will not be productive of coiler breaks, and in which the metal may be decoiled smoothly and evenly. In the prior art practices which I have described, coiler breaks occur either through the tendency of the heavy metal in the coil to resist the decoiling operation whereby the metal is sharply bent at or near the coil from a tangential position, or they occur because at times the coil tends to turn more rapidly than the metal is withdrawn therefrom, which causes a sharp bending of the metal at the pinch rolls or intermediate the pinch rolls and the coil. In the practice of my invention, I provide means whereby the turning of the coil is regulated and controlled so that the metal may be withdrawn tangentially therefrom in an even manner.

Hitherto also, due to the irregularity of the metal in the coil, it has been found necessary to make the standards which form the support for the withdrawing rolls and the roller leveler very widely interspaced, so that the metal can follow an irregular course between the housings without contacting them. As a consequence, very much heavier rolls have had to be used than would otherwise be necessary in order to compensate for the spring of the rolls.

It is an object of my invention to do away with these disadvantages and to provide a mechanism in which the coil may be unwound evenly and in such a way that the housings need not be so greatly interspaced. In the practice of my invention I have found that if a coil is trued and then guided in such a way that the metal enters the rolls essentially in a direction perpendicular to their axes, the weaving of the metal in the rolls can be greatly minimized, and the housings can be much more closely interspaced, with a consequent saving in equipment.

These and other objects of my invention which will be set forth hereinafter, or will be apparent to one skilled in the art upon reading these specifications, I accomplish by that certain construction and arrangement of parts of which I shall now describe an exemplary embodiment. Reference is made to the drawings, wherein.

Figure 1:
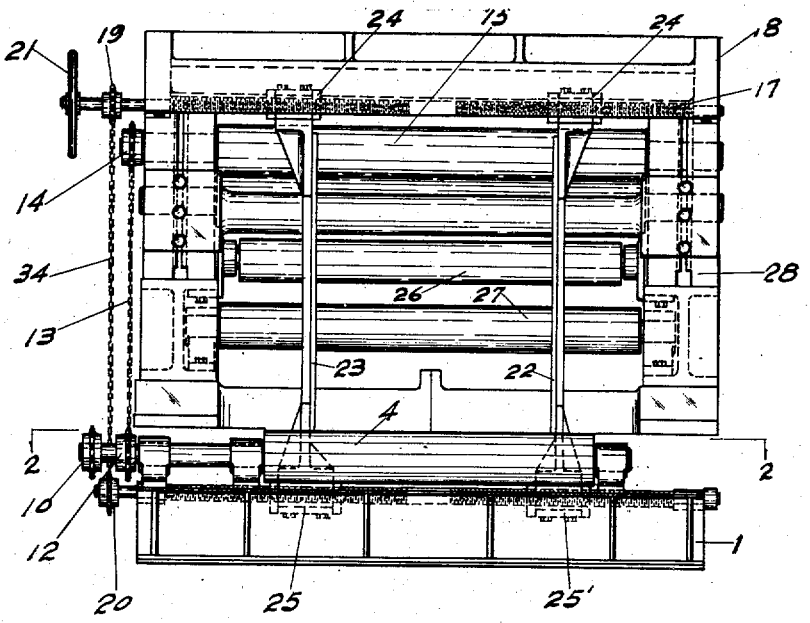
Figure 1 is an elevational view of the entering side of my decoiling apparatus.
Figure 2:
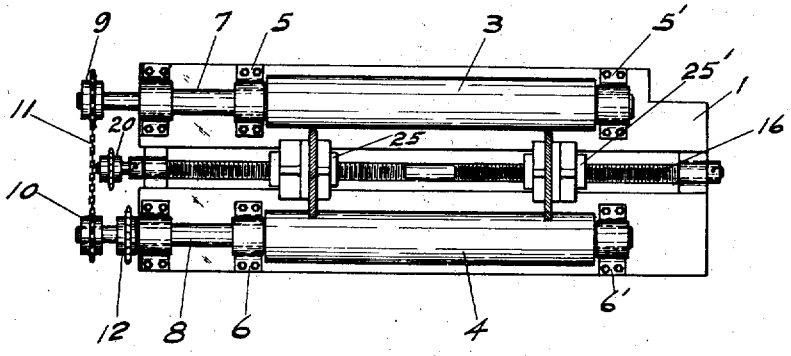
Fig. 2 is a partial plan view of the apparatus taken along the lines 2, 2 of Fig. 1.

Briefly, in the practice of my invention, I provide a cradle for the metal coil, and I drive this cradle in such a way as to control the movements of the coil. As I have hereinabove explained, the coil which is left free to rotate out of timed relationship with the withdrawal of the metal, will tend to produce coiler breaks by producing sharp bends in the metal. In withdrawing the metal substantially tangentially from the coil, if the rotation of the coil is controlled and is caused to bear a timed relationship to the withdrawal of the metal, loops of the metal will not be formed and the decoiling operation proceeds smoothly and without coiler breaks. Consequently, one important feature of my invention is the provision of a driven cradle. Another important feature of my invention is the provision of side guiding members located adjacent the cradle, which serve to guide the coil as the metal is being withdrawn therefrom, and which also may be operative to push into position any telescoped portions of the coil, before or during the decoiling operation.

In the several figures I have shown a framework, indicated generally at 1, which supports the various mechanism of the decoiler, indicated generally at 2. A pair of rolls 3 and 4 serve to support the coiler, and are journaled in bearings 5, 5', 6 and 6'. Shafts on the rolls project through these bearings, and are indicated at 7 and 8. They bear keyed sprocket wheels 9 and 10, which may be connected by a chain 11 so that the concurrent rotation of the rolls 3 and 4 is maintained. One of the shafts bears driving means whereby motion may be transmitted to the rolls in timed relationship with the motion of the other apparatus. To this end I have shown a sprocket wheel 12 keyed on the shaft 8 and connected by a chain 13 to a sprocket 14 on one of the pinch rolls, as will hereinafter be described. The turning of the pinch rolls, which is the agency for withdrawing the metal, will therefore obviously be in timed relationship to the rotation of the rolls 3 and 4 which form the bottom part of my cradle.

Adjacent the rolls, a screw 16, having right and left hand threads, is rotatively mounted upon the framework 1 below the level of the rolls. Another framework 18 mounted on the roller housings and lying essentially above the cradle, carries a second screw 17 with right and left hand threads. Two sprocket wheels 19 and 20 are keyed on the projecting ends of these screws, and are connected by a chain 34. The screw 17 bears a handwheel 21, whereby both of the screws may be concurrently rotated.

Two coil guides 22 and 23, essentially vertically disposed, ride on the two screws 16 and 17. They are provided with shoes 24, 24', 25, and 25', which engage the threads of the screws. A rotation of the handwheel 21 in either direction will serve to bring the guide members 22 and 23 closer together or separate them.

On the main housings I mount the pinch rolls 15 and 15', as shown. In front of the lower pinch roll there is a stripper guide 29 which serves to lead the metal into the pinch between the rolls. Below the pinch rolls are rolls 26 and 27, freely journaled for rotation. These rolls are back-up rolls, against which the coil turns as the metal is withdrawn therefrom. Behind the pinch rolls I have shown sets of leveling rolls, indicated at 32, journaled in the housing, the upper set, as is the usual practice, being mounted in a sliding bearing.

Figure 3:
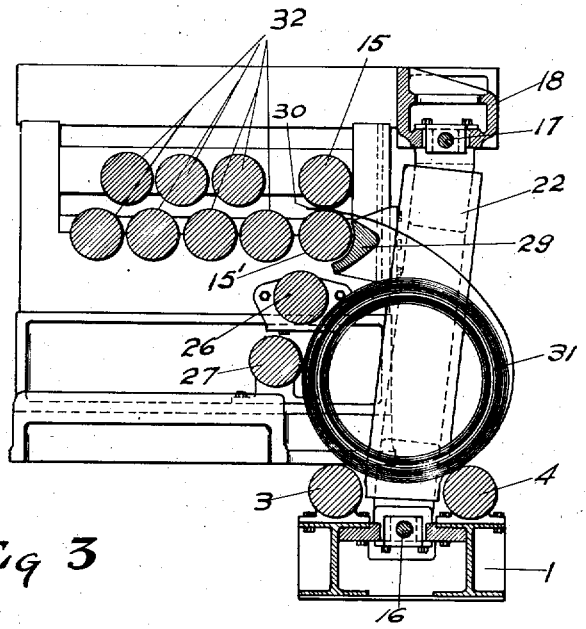
Fig. 3 is a vertical sectional view through my device.
Figure 4:
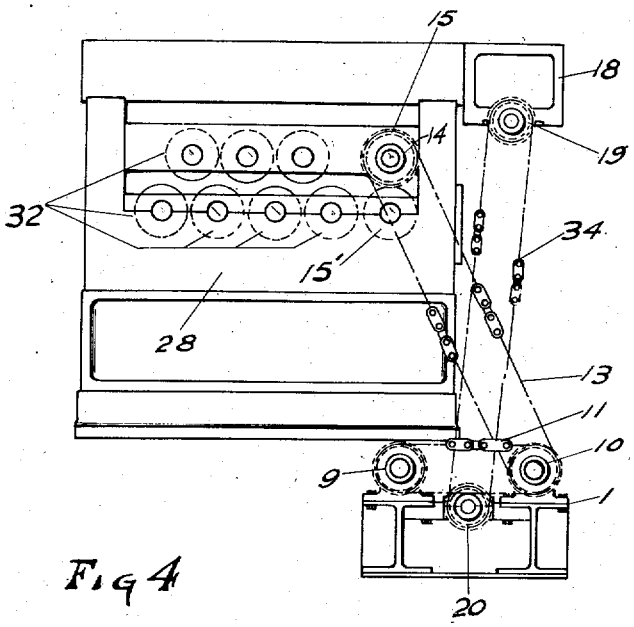
Fig. 4 is a partially diagrammatic end elevation.

Fig. 3 shows a coil of metal 31 at the start of the decoiling operation. Ordinarily such a coil will be delivered to my device by means of a roller conveyor or the like, not shown, but extending to the right of the rolls 3 and 4 in Fig. 3. In operation the guides 22 and 23 are drawn apart by a rotation of the handwheel 21, and a coil 31 is delivered by the conveyor, or otherwise, until it rests upon the rolls 3 and 4. By a rotation of the handwheel 21, the guides 22 and 23 are brought together so that they will true up the coil, squeeze together any telescoping portions thereof, and center the coil with respect to the decoiling device. Since these guides are operated by screws, they are capable of exerting considerable force upon the coil. When the coil has been trued and positioned, the pressure of the guides thereagainst is released somewhat, but the guides are left in such a position that the coil cannot run out of center.

The coil 31 is then rotated so that the projecting end of the metal can be caught between the pinch rolls 15 and 15'. This may be done by hand, but ordinarily proper feeding will be accomplished in the operation of the machine. If the end of the coil hugs the coil, it will usually be bent up slightly before the coil is placed into position. Under these circumstances, the leading end of the coil will be guided by the stripper guide 29 into the pinch between the rolls 15 and 15'. The machine may then be started. As the pinch rolls revolve, the metal is withdrawn from the coil; but since the cradle rolls 3 and 4 are positively driven and are timed in their operation with the pinch rolls, the metal will be withdrawn from the coil 31 in a smooth and even manner, and without the production of coil breaks. As the coil 31 revolves, the side guides 22 and 23 maintain it in a true position, so that the metal enters the rolls along a line substantially perpendicular to their axes.

It will be understood that modifications may be made in my invention without departing from the spirit thereof.

Having thus described my invention, what I claim as new and desire to secure by Letters Patent, is:

1. In a sheet metal decoiling device, a cradle, oppositely movable guiding means located so as to engage the ends of the coil mounted on said cradle, and means for bringing said guiding means toward each other under pressure, whereby to correct a telescope in said coil.

2. In a sheet metal decoiling device, housings, pinch rolls mounted in said housings, a cradle disposed below said pinch rolls, upright members spaced transversely of said cradle to serve as centering guides, and means for concurrently moving said upright members under pressure so as to correct a telescope in a coil, center it, and maintain said coil in centered and telescoped condition.

3. In a sheet metal decoiling device, a framework, pinch rolls and cradle rolls mounted in said framework, screw devices mounted respectively above and below said cradle rolls, and transversely spaced guiding means mounted on said screw means, said screw means adapted concurrently to alter the positions of said guiding means.

4. In a sheet metal decoiling device, a framework, pinch rolls and cradle rolls mounted in said framework, screw means mounted essentially above and below said cradle rolls, and transversely disposed guiding means mounted on said screw means, said screw means adapted concurrently to alter the positions of said guiding means, and a driving connection between said pinch rolls and said cradle rolls.

5. In a decoiling device, oppositely disposed housings, pinch rolls mounted on said housings, leveling rolls mounted on said housings in a position to receive metal from said pinch rolls, a cradle having supporting rolls mounted beneath said pinch rolls, a driving connection between said supporting rolls and said pinch rolls, guiding means spaced transversely of said cradle so as to engage the side edges of a coil therein and with the side edges of the part of the sheet passing from the coil, and means for concurrently moving said guiding means toward or away from each other.

6. In a sheet meal decoiling device, a cradle comprising spaced rolls for supporting the coil of sheet metal, pinch rolls above the cradle to withdraw the sheet metal tangentially from the coil supported on the cradle rolls, and guides spaced transversely of the cradle and extending from near the opposite ends of the space between the cradle rolls to the space horizontally opposite the pinch rolls, to preserve the alignment of the convolutions of the coil and of the tangentially withdrawn portion of the metal from the coil to the pinch rolls.

7. In a sheet metal coiling device as set forth in claim 6, an operative connection from the pinch rolls to the cradle rolls whereby the outer convolution of the coil is driven, and the coil rotated therewith, with the surface travel of said outer convolution equal to the surface travel of the tangentially withdrawn portion of the sheet metal between the pinch rolls.

8. In a sheet metal decoiling device, a cradle for a coil, pinch rolls located above said cradle and closely adjacent to a coil which may be mounted thereon, at least a portion of said cradle having a driving relationship with said coil, a driving connection between said pinch rolls and said cradle portion, said pinch rolls adapted to withdraw metal tangentially from the upper portion of said coil, and abutment means for said coil located adjacent said pinch rolls and beneath said metal as it is being withdrawn from said coil.

9. A process of decoiling metal stock which is subject to coiler breaks, which process comprises withdrawing the metal from a coil in a substantially tangential direction by engaging the metal close to the coil and rotating said coil in timed relationship with said withdrawal, and maintaining the position of said coil with respect to said position of engagement during said withdrawal, so as to prevent sharp bending of the metal, which would produce coiler breaks.

WILLIAM H. HOFER.